US008650132B2

(12) United States Patent
McClurg (10) Patent No.: US 8,650,132 B2
(45) Date of Patent: Feb. 11, 2014

(54) SYSTEM AND METHOD FOR DISTRIBUTION OF SINGLE-PRODUCT-TYPE UNLABELED PACKAGES

(75) Inventor: James McClurg, Grand Rapids, MI (US)

(73) Assignee: United Parcel Service of America, Inc., Atlanta, GA (US)

( * ) Notice: Subject to any disclaimer, the term of this patent is extended or adjusted under 35 U.S.C. 154(b) by 450 days.

(21) Appl. No.: 12/705,015

(22) Filed: Feb. 12, 2010

(65) Prior Publication Data

US 2010/0211426 A1 Aug. 19, 2010

Related U.S. Application Data

(60) Provisional application No. 61/152,552, filed on Feb. 13, 2009.

(51) Int. Cl.
*G06Q 10/00* (2012.01)
*G06F 7/00* (2006.01)

(52) U.S. Cl.
USPC ........... 705/336; 705/333; 705/338; 700/216; 700/227

(58) Field of Classification Search
USPC ........................... 705/330–341; 700/216, 227
See application file for complete search history.

(56) References Cited

U.S. PATENT DOCUMENTS

| 5,841,658 | A | * | 11/1998 | Bouchard | 705/406 |
| 7,257,552 | B1 | * | 8/2007 | Franco | 705/28 |
| 2002/0082893 | A1 | * | 6/2002 | Barts et al. | 705/8 |
| 2002/0123918 | A1 | * | 9/2002 | Brown et al. | 705/7 |
| 2003/0004893 | A1 | | 1/2003 | Balesche | |
| 2003/0105704 | A1 | * | 6/2003 | Sundel | 705/37 |
| 2004/0153379 | A1 | | 8/2004 | Joyce et al. | |
| 2005/0060164 | A1 | * | 3/2005 | Eli Berl Illion | 705/1 |
| 2005/0149413 | A1 | * | 7/2005 | Amling et al. | 705/28 |
| 2005/0171738 | A1 | | 8/2005 | Kadaba | |
| 2005/0246192 | A1 | * | 11/2005 | Jauffred et al. | 705/1 |
| 2005/0252596 | A1 | | 11/2005 | Olsen et al. | |
| 2006/0136237 | A1 | * | 6/2006 | Spiegel et al. | 705/1 |
| 2006/0235739 | A1 | * | 10/2006 | Levis et al. | 705/9 |
| 2006/0282271 | A1 | * | 12/2006 | Ananda et al. | 705/1 |
| 2008/0004967 | A1 | * | 1/2008 | Gillen | 705/24 |

OTHER PUBLICATIONS

Harrison, et al., Information Management in the Product Lifecycle—The Role of Networked RFID, Industrial Informatics, IEEE, 2004, pp. 507-512.*
Boushka, et al., Auto-ID on the Move: The Value of Auto-ID Technology in Freight Transportation, Accenture Auto-ID Center, 2002, pp. 1-26.*
International Search Report dated Jul. 12, 2010; Application No. PCT/US2010/024037.

* cited by examiner

*Primary Examiner* — Daniel Vetter
(74) *Attorney, Agent, or Firm* — Alston & Bird LLP (57) ABSTRACT

Systems and methods for the distribution of single-product-type unlabeled packages are provided. For each distribution, the system coordinates the processes required for: (1) transporting unlabeled packages containing the product from a manufacturing location to a carrier hub; (2) printing and applying respective shipping labels to the unlabeled packages; and (3) sending the labeled packages to their various retail locations. By delegating the tasks of receiving, labeling, and shipping the packages containing the product to a single carrier, the systems and methods allow the carrier to receive the packages for continued processing without the presence of any identifying labels.

20 Claims, 8 Drawing Sheets

SYSTEM AND METHOD FOR DISTRIBUTION OF SINGLE-PRODUCT-TYPE UNLABELED PACKAGES

CROSS-REFERENCE TO RELATED APPLICATIONS

This application claims the benefit of U.S. Provisional Application No. 61/152,552, filed Feb. 13, 2009, which is hereby incorporated by reference in its entirety.

FIELD OF THE INVENTION

The present invention relates to improved systems and methods for the pickup and distribution of a plurality of identical products in unlabeled packages from a manufacturer to one or more customer locations.

BACKGROUND OF THE INVENTION

A major challenge for all parties in the supply chain is streamlining and accelerating the processes of getting a product from its point of manufacture to its point of sale. For typical consumer goods, the time required for a product to get from a manufacturing facility to a customer depends both on the actual time a product is in transit and the additional time it may spend at each destination. Products may experience delays at various points along their routes while waiting for the next step in the delivery process (e.g., waiting to be sorted, or waiting to be picked up by the next handler or dropped off by their current handler, etc.).

Figure 1:
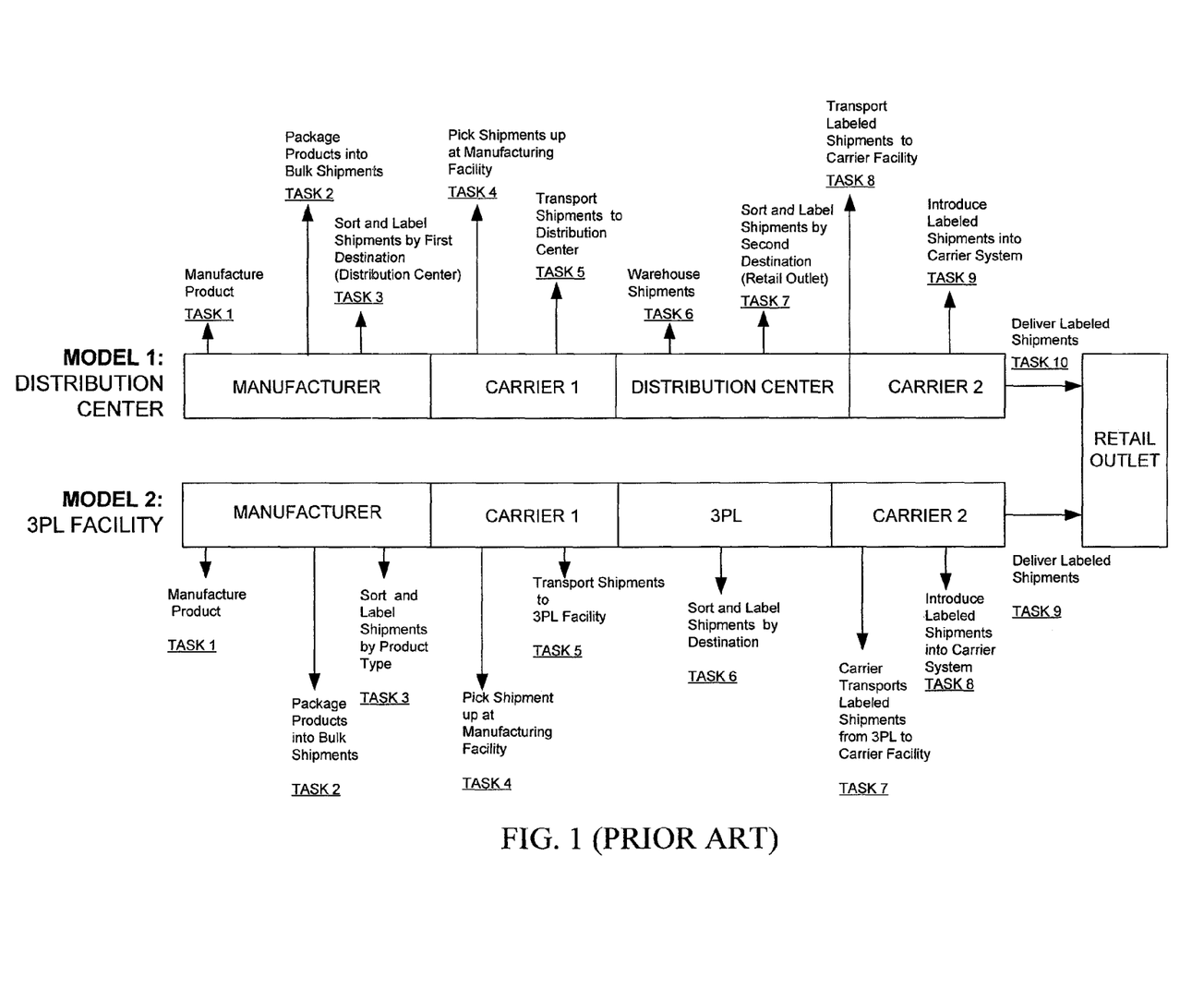
FIG. 1 is a block diagram showing the parties and steps involved in the distribution of a product from its manufacturer to a retail outlet according to two examples in the prior art.

FIG. 1 compares two types of product distribution in the prior art—the distribution center model and the third-party logistics provider (hereinafter, "3PL") model—by following a product from its manufacture to its arrival at a retail outlet. In the traditional distribution scheme, shown in FIG. 1 as Model 1, manufactured products are transported to and stored in a distribution center before being distributed to respective customers. Thus, products traveling through this first model must be sorted at least two times—first by distributor and then by final destination. In this model, the product travels through three different parties before reaching store shelves.

Alternative supply chains have attempted to consolidate the processes involved in the distribution center model by enlisting the help of a 3PL. While some implementations of 3PL Model, shown as Model 2, may eliminate the warehousing step of Model 1, the product still changes hands three times before reaching its retail destination. In Model 2, a product must again be sorted twice where the manufacturer sorts by product and the 3PL sorts by destination. Not only are the steps of sorting and re-sorting time-consuming, but each party or destination through which a product must go before reaching a point of sale also adds to insurance costs and the probability of mishandling or misplacement.

As shown in FIG. 1, while a 3PL may relieve a manufacturer of its responsibility for sorting and labeling packages of goods according to their destination, the manufacturer in the 3PL model is still left with some sorting and labeling operations before the packages are ready to be picked up by the 3PL. Manufacturers are often unequipped to effectively coordinate these distributions to multiple locations due to their lack of logistics resources and experience. In particular, many manufacturers lack the tools necessary to efficiently handle sorting and labeling operations (e.g., sequencing, optimizing, and batch printing). Therefore, whether a product travels through the Distribution Center model or the 3PL model, it runs the same risk of reaching a standstill at the manufacturing facility.

All products or goods could benefit from reduced time-in-transit, particularly because of the carrying costs (e.g., rent and utility fees for warehousing, opportunity costs, etc.). However, some products, such as seasonal merchandise, promotional or marketing items, and perishable goods, specifically require expedited distribution due to their inherently transient character. These time-sensitive goods lose a significant amount of their value, in the form of opportunity costs, if they are not on the market at a given time. Therefore, the time that these time-sensitive products are stalled at a manufacturer's facility can be particularly costly. All of these costs result in higher prices for all downstream parties in the supply chain, including retailers and consumers.

Accordingly, there is a need in the art for a system and method to accelerate a product's movement from its point of manufacture to its retailer.

SUMMARY OF THE INVENTION

The present invention seeks to provide an improved product distribution system for distributing a single type of product from a point of manufacture to a plurality of retail locations by allowing a single carrier to receive, label, and ship unlabeled packages containing one or more units of the product. The system includes a carrier computer system that is capable of receiving and processing data from a manufacturer of the product, a shipper coordinating the distribution of the product, and a plurality of customers receiving the product.

The present invention accomplishes this by providing a system and method for: (a) receiving a distribution list from a shipper system for a plurality of unlabeled packages, wherein the distribution list comprises destination information for each unlabeled package and each unlabeled package contains one or more units of a single type of product; (b) generating a pickup and delivery schedule comprising time and destination information associated with the pickup of the unlabeled packages from a manufacturing facility and the delivery of the shipments to a plurality of respective destinations, wherein the pickup and delivery schedule is based at least in part on the distribution list; (c) dispatching a pickup vehicle to the manufacturing facility based at least on the pickup and delivery schedule; (d) transporting the pickup vehicle containing such unlabeled packages from the manufacturing facility to a distribution point in accordance with the pickup and delivery schedule; (e) generating a plurality of shipping destination labels, wherein the shipping destination labels display information based at least in part on the pickup and delivery schedule; (f) affixing the shipping destination labels to the unlabeled packages at the distribution point, wherein the affixing is performed such that any one of the set of shipping destination labels may be applied to any one of the plurality of unlabeled packages; and (g) transporting the shipments from the distribution point to the respective destinations in accordance with the pickup and delivery schedule.

In another embodiment of the invention, a carrier system for carrying out the distribution of single-product-type unlabeled packages to a plurality of respective destinations is provided. This system includes an order-processing computer comprising one or more processors and one or more memory storage areas, said one or more processors configured to: receive an order from a shipper device, wherein said order comprises: a product identifier associated with a type of product, wherein at least one unit of said type of product is contained in each of a plurality of unlabeled packages; and a distribution list comprising destination information corresponding to said unlabeled packages. The one or more processors is also configured to generate a label request for the creation of a plurality of shipping labels based at least in part on said order; and generate a pickup and delivery schedule comprising time and location data associated with the pickup of said unlabeled packages from a manufacturing facility and the delivery of said shipments to a plurality of respective destinations. The carrier system also includes a carrier hub computer in communication with the order-processing computer comprising one or more processors and one or more memory storage areas, said one or more processors configured to dispatch a pickup vehicle based at least in part on said pickup and delivery schedule to pick up and deliver said unlabeled packages to a distribution point; and a labeling device configured to print said plurality of shipping labels based at least in part on said label request for application to the unlabeled packages at said distribution point, wherein application of any one of said plurality of shipping labels to any one of said unlabeled packages will thereby yield a shipment.

Other objects, features, and advantages of the present invention will become apparent upon reading the following detailed description of the preferred embodiment of the invention when taken in conjunction with the drawing and the appended claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

For the purpose of describing the present invention in detail, certain terms used hereinafter are defined, unless otherwise specified, as follows:

'Carrier' is any individual, partnership or corporation engaged in the business of transporting goods.

'Carrier hub' is a carrier-operated facility with package handling capabilities.

'Carrier's logistics network' comprises physical assets and human resources utilized by or associated with a carrier to facilitate the transportation of goods. The physical assets component of 'carrier's logistics network' may include, but is not limited to, facilities, vehicles or other forms of transportation, computers or other electronic devices, hardware, software, databases, printers or other machinery, or any other physical assets that may facilitate the carrier's package handling operations. The human resources component of 'carrier's logistics network' may include, but is not limited to, carrier employees or third parties providing services or facilitating operations related to package handling. Employees in 'carrier's logistics network' include those hired by carrier or a third party, and may be employed on a full-time, part-time, temporary, or contract basis.

'Computer' broadly refers to any kind of device which receives input data, processes that data under computer instructions in a program or object, and generates output data such as a RFID tag data. A 'computer' can be a hand-held device, laptop computer, desktop computer, miniframe, mainframe, server, or other computing device, for example. A 'computer' generally includes a processor and a memory, and input and output units with an interface unit enabling connection to other computers or devices.

'Connected' refers to any connection between two computers permitting communication of data. Two devices can be connected directly together or indirectly through one or more intermediate elements, to permit communication of a signal or data from one device to the other. Connection media includes wire, optical fiber, or wireless transmission media such as air or space, permitting communication of data or a signal.

'Customer' refers to any person or organization designated to receive a shipment of goods. The term 'customer' may include retail outlets, distributors, warehouse facilities, suppliers, manufacturers, vendors, wholesaler, goods providers, merchants, individual consumers or users of any manufactured good, or any other such entities.

'Input unit' can be a keyboard, keypad, mouse, wand, stylus, touchpad, joystick, voice receiver, or any other device capable of receiving input data from a human user.

'Interface Unit' can be a network interface card (NIC), a modem, or other interface device.

'Manufacturer' broadly refers to any producer, maker, or supplier of products. A 'manufacturer' for purposes of this invention can be any entity in possession of single-product goods.

'Memory' can be any device capable of storing data, including random-access memory (RAM), read-only memory (ROM), electrically-erasable read-only memory (EEPROM), hard disk and disk drives, compact disc (CD), digital versatile disc (DVD), magnetic tapes and tape drives, optical storage media, quantum memory devices, and any other device that can be used to store data in readable form.

'Processor' can be any device capable of receiving, processing, and outputting data under execution of a computer program or object, including a microprocessor, microcontroller, programmable gate array (PGA), field programmable gate array (FPGA), programmed array logic (PAL), programmable logic array (PLA), or other such device.

'Output unit' can be a display monitor (e.g., CRT or flat panel display), speaker, vibration unit, or any other device that can be used in a computer to generate a humanly perceptible presentation.

'Server' is a computer. The term can have a more refined meaning as a computer that executes a server application responsive to computers executing client applications or the like, i.e., client-server architectures.

'Shipment' is one or more packages labeled for delivery to a specified location. A 'shipment' could also be a group of packages destined for the same address.

'Shipper' refers to any company or individual who initiates the transport of goods. Such a 'shipper' can be a manufacturer, supplier, vendor, distributor, third-party facilitator, customer, retail store, warehouse facility, broker, dealer, or any other such entity.

'Unlabeled' for purposes of the present invention signifies the absence of a shipping label. Other labels with indicia signifying non-destination information may be present.

'Vehicle' is any instrument of transportation capable of holding and temporarily storing goods.

OVERVIEW OF VARIOUS EMBODIMENTS

In general, according to various embodiments of the present invention, a carrier leverages its extensive network of resources to streamline the processes required to distribute a supply of mass-produced goods from a point of production to various destinations. Embodiments of the present invention entrust a carrier with efficiently distributing shipments of unlabeled packages containing single-product goods from a manufacturer to a plurality of destinations.

In various embodiments, the carrier receives a distribution list that specifies a quantity of goods and a destination for each shipment of unlabeled packages. The carrier assigns a pickup vehicle to carry one or more shipments and records the pickup vehicle assignment in a database. The pickup vehicle assignments may be exclusive (i.e., a pickup vehicle may only service one distribution list at a time), and the carrier's database may be configured to identify a package's associated distribution list by its pickup vehicle. Therefore, the packages in the pickup vehicle need not be identifiable as containing any particular product. Since the contents of the packages on the distribution list are identical, any package in the pickup vehicle can be sent to any customer on the distribution list. Accordingly, the packages do not need to be marked, labeled, or otherwise distinguished from one another. As such, embodiments of the present invention may eliminate the need to apply any labels to the packages at the manufacturing facility before proceeding to the next stage of distribution.

By removing the labeling requirement, the present invention reduces a product's total time-in-transit as compared to the prior art and allows products to begin moving in the distribution stage after production. Products may enter the carrier's delivery system—into the carrier's delivery trucks—shortly after they leave the assembly line. Accordingly, products may leave their cost-accumulating roles and may be given revenue-generating opportunities relatively quickly.

First Embodiment

Context

In a first embodiment of the present invention, a shipper is faced with the task of providing each of its customers with a discrete quantity of a particular product within a specified time period. The shipper could be, for example, a designer commissioned by a retail company to produce a time-sensitive promotional item for the retail company's various stores (i.e., the customers). In the prior art, the shipper would have been responsible for overseeing logistics relating to both the manufacture and distribution of the products. However, various embodiments of the present invention allow a carrier, upon receipt of a shipper's distribution list, to relieve the shipper of its distribution responsibilities. The carrier may obtain the products directly from the manufacturer and distribute packages containing the product in accordance with a distribution list.

System Overview

Figure 2:
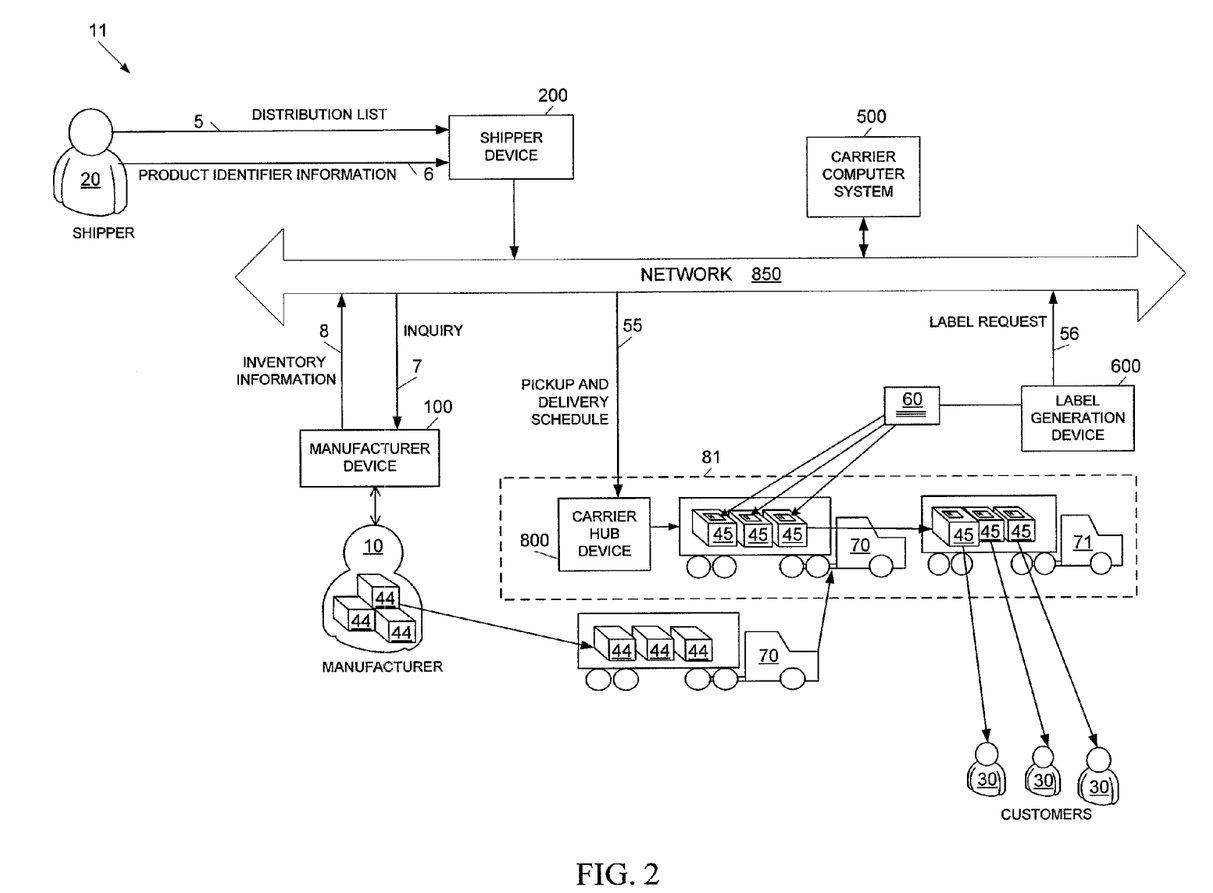
FIG. 2 is a schematic diagram illustrating the interaction of various components of system 11 in accordance with a first embodiment of the present invention.

FIG. 2 illustrates the components and data flow within the first embodiment of the system 11. As illustrated in FIG. 2, the system 11 involves a number of customers 30, a manufacturer 10 operating a manufacturer device 100, a shipper 20 operating a shipper device 200, and a carrier computer system (hereinafter, "CCS") 500 in communication with both the manufacturer device 100 and the shipper device 200. In the first embodiment, the CCS 500 is also in communication with a carrier hub device 800 and a label generation device 600. The CCS 500 may be configured to transmit and receive data from one or more of the shipper device 200, manufacturer device 100, carrier hub device 800, or label generation device 600, via a network 850 or interne connection. Technical aspects of the CCS 500 are further detailed below.

In this first embodiment, information regarding distribution, including a distribution list 5 and product identifier information 6, is obtained from the shipper 20. The product identifier information 6 may include the identity of the particular product selected for shipment, the identity of the manufacturer 10 of the product, and the address of the selected manufacturer 10. The distribution list 5 specifies the identities of the customers 30 receiving the products, the customers' location information, and the quantity of products to be shipped to the respective customers. In variations of this embodiment, this information may have been determined directly by the shipper 20, communicated to the shipper 20 by the individual customers 30, or received from a third-party. In any case, the shipper 20 may input the distribution list 5 and the product identifier information 6 into its shipper device 200. The shipper device 200 is then capable of transmitting the distribution list 5 and the product identifier information 6 to the CCS 500.

The CCS 500 is capable of coordinating the logistics associated with the unlabeled packages' pickup, labeling, and distribution. For example, the CCS 500 may be configured to select a carrier hub facility 81 to service the pickup of the products, which are contained in the unlabeled packages 44, from the manufacturer 10. Selection of the carrier hub facility 81 may be based on factors such as proximity to the manufacturer 10, availability of the required resources to carry out tasks related to distribution, processing speed (e.g., as may be determined from time-in-transit data—see U.S. Patent Application Publication No. 2007/0208585 A1, which is incorporated herein in its entirety by reference), or capacity to service the product shipments (e.g., availability of human or machine resources to carry out package handling and labeling). The CCS 500 is further capable of generating a pickup and delivery schedule 55 and communicating the pickup and delivery schedule 55 to a carrier hub device 800 associated with the selected carrier hub 81, which may receive and label the unlabeled packages 44.

In addition, the CCS 500 may transmit a label request 56 to a label generation device 600 via the network 850 and identify the carrier hub 81 at which labeling operations are to be carried out. In various embodiments, the label request 56 may be generated by the CCS 500 using data extracted from the distribution list 5. In many cases, the label generation device 600 may be part of a large printing system located at a central location in the carrier's logistics network. For example, if the carrier's logistics network services North America, then the label generation device 600 may be located centrally in Chicago, Ill. The label generation device 600 generates the shipping labels 60 that identify the customers' locations so that the shipments 45 can be routed properly by the carrier hub 81. The CCS 500 may coordinate the pickup of the shipping labels 60 from the label generation device and their delivery to the carrier hub 81 by dispatching vehicles and logistics assets of the carrier's logistics network.

Based on the pickup and delivery schedule 55, the carrier hub device 800 dispatches a pickup vehicle 70 to pick up the unlabeled packages 44 at the manufacturer's location and transport them back to the selected carrier hub 81. Once the shipping labels 60 and their corresponding unlabeled packages 44 arrive at the carrier hub 81, handlers apply the shipping labels 60 to the unlabeled packages 44. Because the contents of the unlabeled packages 44 are identical, the shipping labels 60 do not need to be applied to the unlabeled packages 44 in any particular order or according to any specified assignment. Instead, any shipping label 60 can be applied to any unlabeled package 44, and all of the resulting shipments 45 can be forwarded to the carrier's logistics network for transport to the customer destinations indicated on their respective shipping labels 60. Thus, the shipments 45 are delivered to the customers 30 having been address-labeled only once, and having traveled through only a single carrier's logistics network.

System Architecture

As illustrated in FIG. 2, in the first embodiment of the present invention, a manufacturer device 100, a shipper device 200, and a carrier hub device 800 are in communication with the CCS 500. The manufacturer device 100, shipper device 200, and carrier hub device 800 may be any devices capable of communicating voice and/or data over a network. These may include, for example, landline telephones, cellular telephones, PDA's, pagers, personal computers, laptops, camera phones, or the likes thereof. For example, the shipper 20 or manufacturer 10 may use a cellular telephone to communicate a distribution list 5 or inventory information 8 to the CCS 500. In other embodiments, the shipper 20 or the manufacturer 10 may, for example, use a Hypertext Markup Language (HTML) browser on a cellular telephone to access a carrier website or send a text message (e.g., a Short Message Service (SMS) message) to the CCS 500. Alternatively, the shipper 20 or the manufacturer 10 may have a conversation with an operator associated with the carrier 50, or use an application installed on a cellular telephone, to transmit the requisite information.

In various embodiments, each of the shipper device 200, manufacturer device 100, carrier hub device 800, and label generation device 600 may communicate with the CCS 500 over the same network 850, or as one of ordinary skill in the art will recognize, over separate networks. For example, while the manufacturer 10 may communicate with the CCS 500 using its landline phone over the public switched telephone network, the carrier hub device 800 may communicate with the CCS 500 over a Wireless WAN. In various embodiments, the CCS 500, carrier hub device 800, and label generation device 600 may or may not reside on and are in electronic communication with the CCS 500. The shipper device 200 and manufacturer device 100 may be in electronic communication with, and may or may not reside apart from the CCS 500. In other embodiments, however, one or more of the CCS 500, carrier hub device 800, or label generation device 600 may reside on another server or other electronic device.

Shipper Device

The shipper device 200 may be a computer in communication with the network 850 and may be configured to transmit data, such as the distribution list 5 and product identifier information 6, to the CCS 500. In addition to including general information identifying the type of product requested, the product identifier information 6 may also indicate the products' location (i.e., the location of the manufacturer 10 supplying the product).

Manufacturer Device

The manufacturer device 100 may be a computer in communication with the network 850 that is configured to communicate with the CCS 500. In one embodiment, the CCS 500 may be configured to communicate an inventory inquiry 7 to the manufacturer device 100 over the network 850. For this purpose, the manufacturer device 100 of various embodiments may be a computer configured to receive the inventory inquiry 7 from the CCS 500. A processor (not shown) of the manufacturer device 100 may be further capable of transmitting inventory information 8 to the CCS 500.

Label Generation Device

The system of various embodiments may further include a label generation device 600 also in communication with the CCS 500. In various embodiments, the processor 65 may be capable of transmitting the label request 56 to the label generation device 600. For this purpose, the label generation device 600 may be configured to receive the label request 56 from the CCS 500. The processor (not shown) of the label generation device 600 may be further configured to print the shipping labels 60 based on the label request 56.

In the illustrated embodiment, the label generation device 600 is a centrally located device within the carrier's logistics network. The label generation device 600 may be selected from one or more label generators in various geographic regions. The selection of a label generation device 600 may be based on its proximity to the carrier hub facility 81. In various embodiments, the label generation device 600 could be located within the carrier hub facility 81 or within another carrier hub 80. However, it is appreciated that in other embodiments of the present invention, the label generation device 600 may be outside of the carrier's logistics network, and the shipping labels 60 may be generated by a third party.

Carrier Hub Device

The carrier hub device 800 may be capable of connecting to the network 850 to receive the pickup and delivery schedule 55 from the CCS 500. At the carrier hub facility 81, the carrier hub device 800 may access the pickup and delivery schedule 55 to facilitate a series of functions central to distribution in various embodiments of the present invention. These functions may include dispatching the pickup vehicle 70 to the manufacturer 10, loading the unlabeled packages 44 into the pickup vehicle 70, transporting the pickup vehicle 70 containing the unlabeled packages 44 back to the carrier hub 81, receiving the shipping labels 60 from the label generation device 600, affixing the shipping labels 60 to the unlabeled packages 44, transporting the shipments 45 to various carrier delivery units 71, and dispatching the carrier delivery units 71 to various destinations.

Therefore, the proximity of the carrier hub facility 81 to the other parties involved in the distribution may significantly affect the total transit time of the shipments. For example, the location of the carrier hub facility 81 will not only affect the time-in-transit of the unlabeled packages 44 from the manufacturer 10, but it will also affect the time required for the pickup vehicle 70 to be dispatched to the manufacturer 10 at the onset. Furthermore, proximity of the carrier hub 81 to the label generation device 600 will also affect time-in-transit of the shipping labels 60.

It should be noted that in this exemplary embodiment, one or more carrier delivery units 71 transport shipments 45 directly from the carrier facility 81 to the customers 30. However, in alternative embodiments, the carrier delivery units 71 may transport shipments 45 to other carrier hubs 80.

Carrier Computer System

Figure 3:
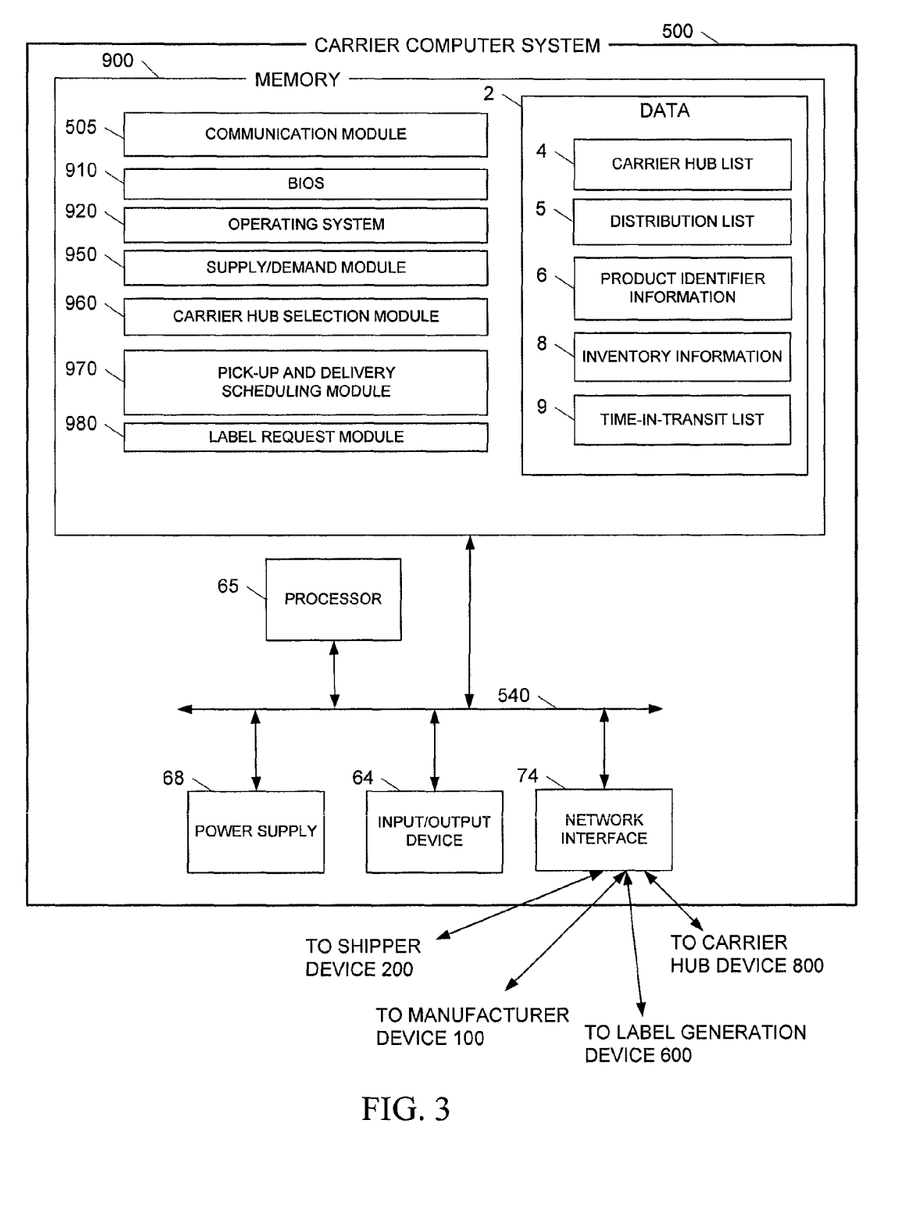
FIG. 3 is a schematic diagram of a carrier computer system according to various embodiments of the present invention.

As discussed above, the CCS 500 is capable of coordinating the logistics associated with the pickup, labeling, and distribution of the unlabeled packages. FIG. 3 is a schematic diagram of the CCS 500 according to one embodiment of the invention, wherein the CCS 500 includes a processor 65 that communicates with other elements within the CCS 500 via a system interface or bus 540. In various embodiments, the processor 65 may be connected to at least one interface or other means for displaying, inputting, transmitting and/or receiving data, content or the like. The interface, in turn, may comprise any of a number of devices allowing the entity to receive data from a user, such as a keypad, a touch display, a joystick, a pointing device or other input device. In various embodiments, the device may be used in combination with a monitor. In this embodiment, the processor 65 is connected to an input/output device 64 for entering and displaying data, a network interface 74 for interfacing and communicating with other elements of the computer network, and a power supply 68.

The processor 65 may be configured to perform the processes discussed above with regard to FIG. 2. For example, according to various embodiments, the processor 65 is in communication with or includes a memory 900, such as volatile and/or non-volatile memory that stores content, data or the like. In the illustrated embodiment, the memory 900 is used to store a basic input/output system (BIOS) 910 containing the basic routines that help to transfer information between elements within the CCS 500. The memory 900 may also store software applications, instructions or the like for the processor 65 to perform the operations described herein with regard to various modules. Furthermore, the memory 900 may also contain a data section 2, which may be accessed by the processor 65 and by any modules stored in the memory 900.

Figure 5:
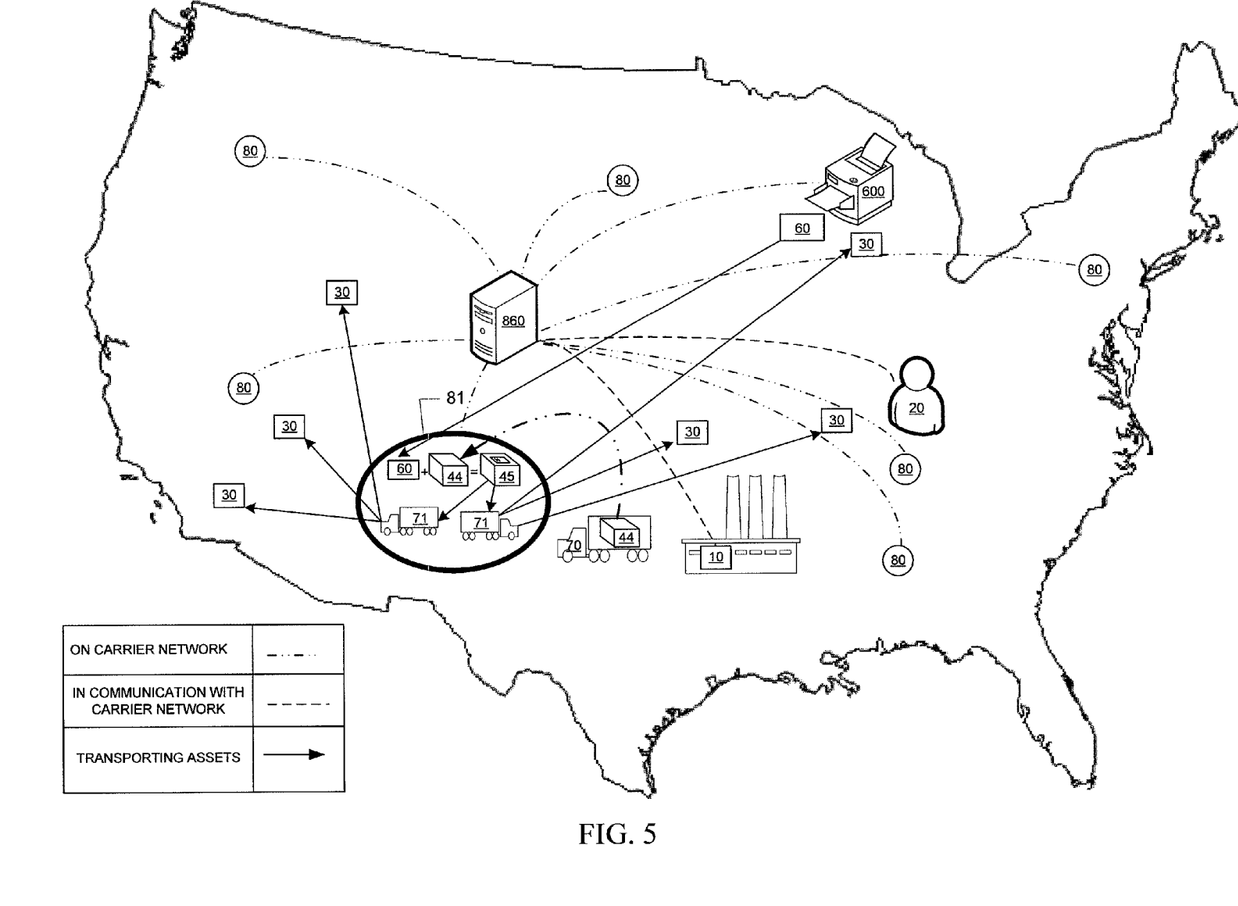
FIG. 5 is a schematic diagram illustrating a geographical layout of components involved in a distribution system in accordance with various embodiments.

As may be understood from FIG. 3, in this embodiment, the data section 2 of the memory 900 is configured to store a carrier hub list 4, a distribution list 5, product identifier information 6 and inventory information 8. The carrier hub list 4 comprises a directory of carrier hubs 80 and may include information pertaining to each hub, such as address, capacity, hours of operation, batch printing capabilities, and any other characteristic information. A plurality of carrier hubs 80 in an exemplary carrier's logistics network is illustrated in FIG. 5. The CCS 500 may be capable of accessing the carrier hub list 4 for the purpose of selecting the carrier hub 81 to carry out the distribution. In various embodiments, a carrier hub server (not shown) will manage one or more of the dispatching of the pickup vehicle to the manufacturer, the loading of the unlabeled packages into the pickup vehicle, the receiving of the pickup vehicle 70 at the carrier hub, the labeling of the unlabeled packages, the sorting of the resultant shipments, or the transporting of shipments to their respective next destinations.

In the present embodiment, the product identifier information 6 includes contact information and the address of one manufacturer of the product. However, in alternative embodiments, product identifier information may correspond to one or more manufacturers. The CCS 500 may be configured to process the product identifier information 6 to determine a manufacturer's location.

In various embodiments of the present invention, the CCS 500 is also capable of storing a time-in-transit (sometimes referred to hereinafter as "TNT") list 9 in its memory 900. The CCS 500 may also be configured to store a pickup and delivery schedule in its memory 900.

A number of program modules including, for example, an operating system 920, may also be stored by the various storage devices and be capable of being executed by the processor 65. The CCS 500 may further store a communication module 505, which is configured to carry out the transmission and receipt of data when executed by the processor 65. Additional modules executed by the processor 65 may include a supply/demand module 950, a carrier hub selection module 960, a pickup and delivery scheduling module 970, and a label request module 980. The processor 65 may be configured to execute these and various other modules to control certain aspects of the operation of the CCS 500, with the assistance of operating system 920.

Supply/Demand Module

The supply/demand module 950 may be used by various embodiments of the present invention to determine whether or when the manufacturer will have a specified quantity of goods required for distribution. The supply/demand module 950 may be configured to access product identifier information 6. In various embodiments, the supply/demand module 950 may process a distribution list 5 to generate an inquiry 7 to the manufacturer device 100 requesting inventory information 8. Inventory information 8 may include one or more of the type of goods requested by the shipper 20, an identifier associated with the good, a quantity of goods, a quantity of shipments, a minimum quantity of goods or shipments requested, or a requested date of pickup or delivery for the goods. In one embodiment, the supply/demand module 950 may be configured to match the distribution list 5 with the manufacturer's inventory information 8 to generate a time window when a required quantity of the desired product will be available for pickup.

Carrier Hub Selection Module

In various embodiments of the present invention, the processor 65 may be configured to execute the carrier hub selection module 960 to locate the carrier hub facility 81 closest to a given location, such as the manufacturer 10. In various embodiments, the processor 65 may be configured to access the carrier hub list 4 and product identifier information 6 in the memory 900 when executing the carrier hub selection module 960. The carrier hub list 4 may comprise a complete listing of all of the carrier hub facilities 80 and their corresponding locations. Product identifier information 6 may comprise location information for a designated manufacturer 10. Therefore, in various embodiments, the processor 65 executing the carrier hub selection module 960, may be capable of using the carrier hub list 4 and the product identifier information 6 to identify the carrier hub facility 81 that is closest to the manufacturer 10 identified by the shipper 20.

FIG. 5 provides a geographical illustration of carrier hub selection in accordance with various embodiments of the present invention. In this example, for purposes of simplicity, the geographic scope is limited to the United States. However, it is well-known in the art that carriers may have hub locations 80 in all regions of the world. The carrier depicted in this example has a plurality of carrier hubs 80 and 81 throughout the U.S. By identifying and locating the manufacturer 10 and accessing the carrier hub list 4, the carrier hub selection module 960 may be capable of selecting the closest carrier hub facility 81.

In various other embodiments, the carrier hub selection module 960 may evaluate factors other than distance when selecting a carrier hub facility 81. In one embodiment, such factors may include road conditions between a carrier hub 80 and the manufacturer 10, or the availability of resources at a carrier hub 80. In other embodiments, selection of the carrier hub facility 81 may be a function of both distance to the manufacturer 10 and distance to the label generation device 600. In various other embodiments, selection of the carrier hub facility 81 may factor in distance to one or more customers 30. The carrier hub selection module 960 may access the TNT list 9 to evaluate the suitability of a given carrier hub 80 for a particular distribution.

The TNT list 9 comprises a database estimating the amount of time required for a shipment 45 in the carrier's system 11 to get from its origin to a destination. Origin and destination information in the TNT list 9 may be provided in terms of any combination of zip codes, closest carrier hubs, address location, carrier district, or possibly other geographical designations. The TNT list 9 may be capable of being accessed by the CCS 500 for the purpose of creating the pickup and delivery schedule 55. For example, the shipper 20 may request in a distribution list 5 that two customers 30 (e.g., Customer A and Customer B) receive shipments 45 of a certain product on the same day. Suppose Customer A is in California, Customer B is in New York, and the manufacturer 10 is in Massachusetts. The TNT list 9 will provide the carrier with two estimates—the time required by the carrier to provide one shipment 45 from the manufacturer 10 to Customer A and the time required by the carrier to get another shipment 45 from the manufacturer 10 to Customer B. To schedule both shipments 45 to arrive at Customer A and Customer B on the same day, the carrier may stagger Customer B's delivery by the difference in the corresponding amounts of time returned by the TNT list 9.

Pickup and Delivery Scheduling Module

Referring to FIGS. 2 and 3, according to one embodiment, the pickup and delivery scheduling module 970 may be configured to generate a customized pickup and delivery schedule 55 based at least in part on the distribution list 5 and the inventory information 8. In various embodiments, the pickup and delivery scheduling module 970 may, amongst other things, access the manufacturer's inventory information 8 to determine when the unlabeled packages of goods 44 will be available for pickup. The processor 65 may be configured to execute the pickup and delivery scheduling module 970 to match the time for pickup generated by the supply/demand module 950 with data regarding the availability of the pickup vehicles 70 to designate a time to pick up the unlabeled packages 44 from the manufacturer 10.

Label Request Module

Various embodiments of the present invention may also include a label request module 980, which may facilitate communication between the CCS 500 and the label generation device 600 and coordinate the contents and application of the shipping labels 60. As described above, in addition to destination information, the shipping labels may also contain a tracking number or information relating to the contents, carrier, or service level. In various embodiments, the label request module 980 may access the pickup and delivery schedule 55 to determine when the shipping labels are needed or the order the shipping labels should be printed.

While the foregoing describes the software of embodiments of the invention in terms of modules by way of example, as one of ordinary skill in the art will recognize in light of this disclosure, the software associated with embodiments of the invention need not be modularized and, instead, may be intermingled or written in other non-modular formats. Furthermore, it is important to note that the computer-readable media described above could be replaced by any other type of computer-readable media known in the art. Such media may include, for example, magnetic cassettes, flash memory cards, digital video disks, and Bernoulli cartridges.

In addition, while the foregoing refers to a "carrier computer system," as one of ordinary skill in the art will recognize in light of this disclosure, any distributed computing device or network system operating in computer architectures in a client-server architecture or in some other computer architecture may likewise be configured to perform the functionality described herein. Embodiments of the present invention should, therefore not be limited to a single server or to a client-server architecture. Moreover, the designation "carrier" merely serves to describe the common functionality the server provides for multiple clients or other computing devices and does not require or infer the server must be operated or located at a carrier facility.

Methods for Distributing Unlabeled Packages

Figure 4A:
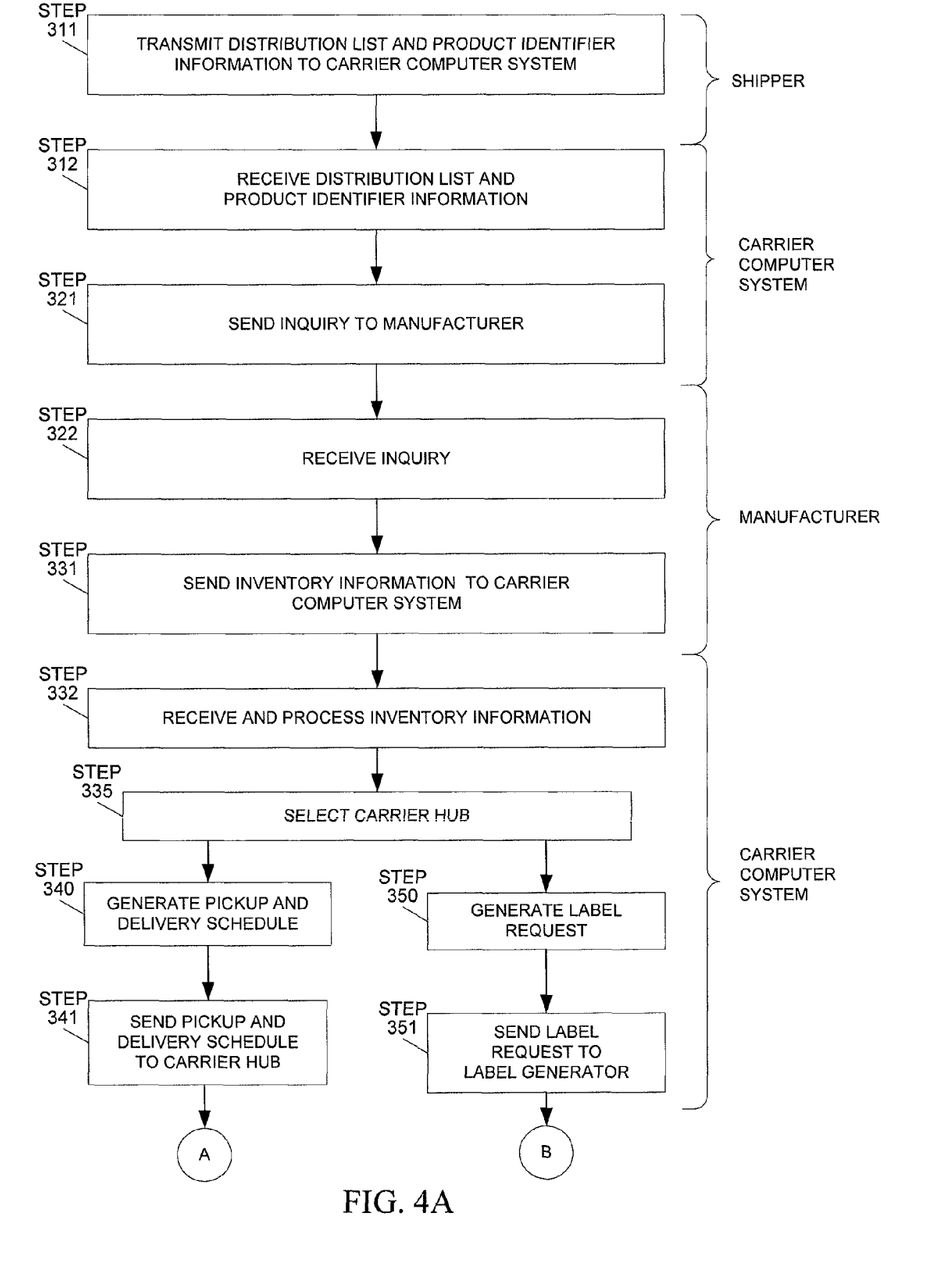
FIGS. 4A and 4B are block diagrams illustrating processes performed by a method in accordance with various embodiments of the present invention
Figure 4B:
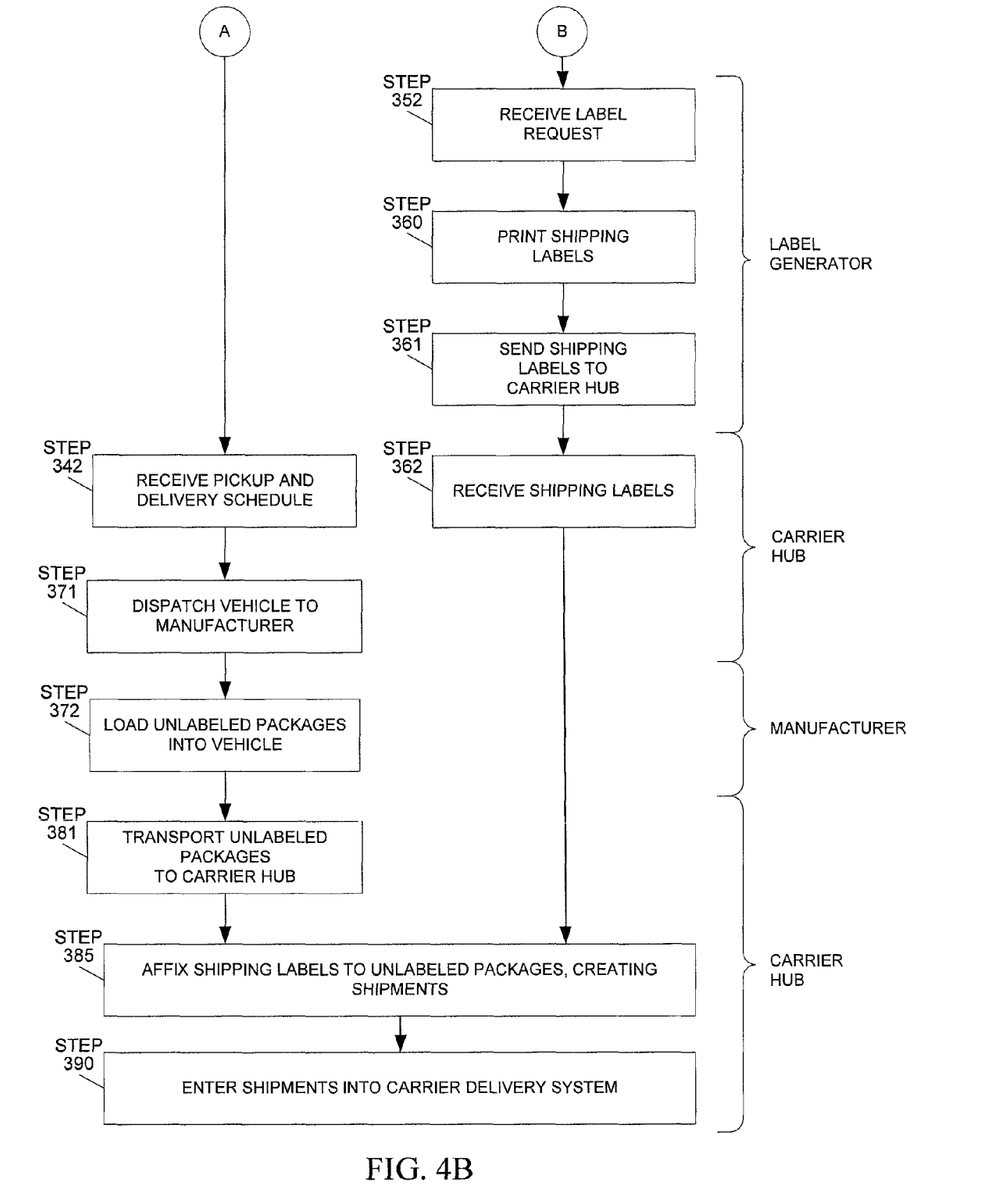

With reference to FIGS. 4A and 4B, the following paragraphs describe method steps that may be performed in accordance with embodiments of the present invention. In this embodiment, the process begins at Step 311 when the shipper 20 transmits a distribution list 5 and product identifier information 6 to the carrier 50. In various embodiments, the distribution list 5 designates one or more customers 30 to receive shipments 45 of a manufactured product, and the product identifier information 6 designates a manufacturer 10 of the product. The product identifier information 6 may further specify the location of the manufacturer 10.

Continuing to Step 312, the CCS 500 receives the distribution list 5 and the product identifier information 6. Then in Step 321, the carrier determines the availability of the requested goods by sending an inventory inquiry 7 to the manufacturer 10. In various embodiments, the inventory inquiry 7 may include a request for confirmation of whether the manufacturer 10 will be able to supply a specified quantity of the goods by a specified date. The manufacturer 10 receives the inventory inquiry 7 in Step 322 and sends a response comprising inventory information 8 to the CCS 500 in Step 331.

In Step 332, the CCS 500 receives and processes the inventory information 8. The inventory information 8 may include information regarding the manufacturer's current stock of the goods requested. In various embodiments, the inventory information 8 may further include the manufacturer's production forecast for the goods requested. In various embodiments, the CCS 500 processes the inventory information 8 for the purpose of analyzing a manufacturer's ability to supply the products specified in the distribution list 5. This process may be performed by the supply/demand module 950 as discussed in greater detail previously.

In Step 335, the CCS 500 selects a carrier hub 81 to facilitate the distribution of unlabeled packages 44 from the manufacturer 10. In various embodiments, the selection of the carrier hub 81 may be based on its proximity to the manufacturer's location. FIG. 5 depicts the selection of the carrier hub 81 in accordance with an embodiment of the present invention. This process may be performed by the carrier hub selection module 960 as discussed in greater detail previously.

In Step 340, the CCS 500 processes the inventory information 8 and the distribution list 5 to generate a customized pickup and delivery schedule 55. This process may be performed by the pickup and delivery scheduling module 970 as discussed in greater detail previously. In Step 341, the CCS 500 transmits the pickup and delivery schedule 55 to the carrier hub device 800 associated with the selected carrier hub 81.

Continuing to Step 371 of FIG. 4B, after receiving the pickup and delivery schedule 55 in Step 342, the carrier hub device 800 dispatches a pickup vehicle 70 to the manufacturer's location based on the pickup and delivery schedule 55. In various embodiments, the pickup vehicle 70 may be a single ground truck. In alternative embodiments, depending on the size of the shipment 45 and the location of the manufacturer 10, the pickup vehicle 70 may be multiple delivery trucks, an ocean vessel, or any other instrument of transportation. In an embodiment of the present invention, either the CCS 500 or the carrier hub device 800 may designate a unique identifier for the shipment 45 and associate the unique identifier with the pickup vehicle 70 upon its dispatch to the manufacturer 10.

In Step 372, the pickup vehicle 70 arrives at the manufacturing facility, and the unlabeled packages 44 are placed within the pickup vehicle 70. In this embodiment, all of the unlabeled packages 44 are loaded into the pickup vehicle 70 and, in Step 381, are transported to the carrier hub 81 for distribution and labeling.

Returning to FIG. 4A, after selecting carrier hub at Step 335, a label request may be generated at Step 350. At Step 350, the CCS 500 generates a label request 56 based on the pickup and delivery schedule 55. In Step 351, the CCS 500 transmits the label request 56 to a label generation device 600.

In Step 352 of this embodiment shown in FIG. 4B, the label generation device 600 processes the label request 56 to generate the shipping labels 60 for the unlabeled packages 44. In Step 360, the label generation device 600 prints the shipping labels 60. In various embodiments of the present invention, the shipping labels 60 may provide one or more of a destination location, information about contents, carrier information, service level, tracking information, etc. In various embodiments, the label generation device 600 may be located at a central geographic region.

In Step 361, the shipping labels 60 are delivered from the label generation device 600 to the carrier hub facility 81. At the carrier hub facility 81, the shipping labels 60 are received (Step 362) and applied to the unlabeled packages 44 (Step 385). In various embodiments, Steps 362 and 385 may be performed by human handlers, machines, or a combination thereof. In various embodiments, Steps 362 and 385 are performed entirely within the pickup vehicle 70 to ensure that the unlabeled packages 44 are not confused with other unlabeled packages containing another type of good. In various embodiments, the shipping labels 60 may be applied to the tops of the unlabeled packages 44 to prevent double-labeling or no-labeling errors. In various embodiments, Steps 350 through 362 may be executed simultaneously with, or in parallel with, Steps 340 through 381.

In Step 390, the newly labeled packages, referred to here as shipments 45, are entered into the carrier's delivery system for delivery to their next destination. In various embodiments, the next destination for the shipments 45 may be target carrier hubs or the customers 30. For instance, the customers 30 may be retail outlets geographically dispersed throughout the United States, as depicted in FIG. 5. In other embodiments, the customers 30 may be any combination of one or more retail stores, warehouses, distribution centers, manufacturers, wholesalers, individual consumers, third-party facilitators, or carriers.

Second Embodiment

Figure 6:
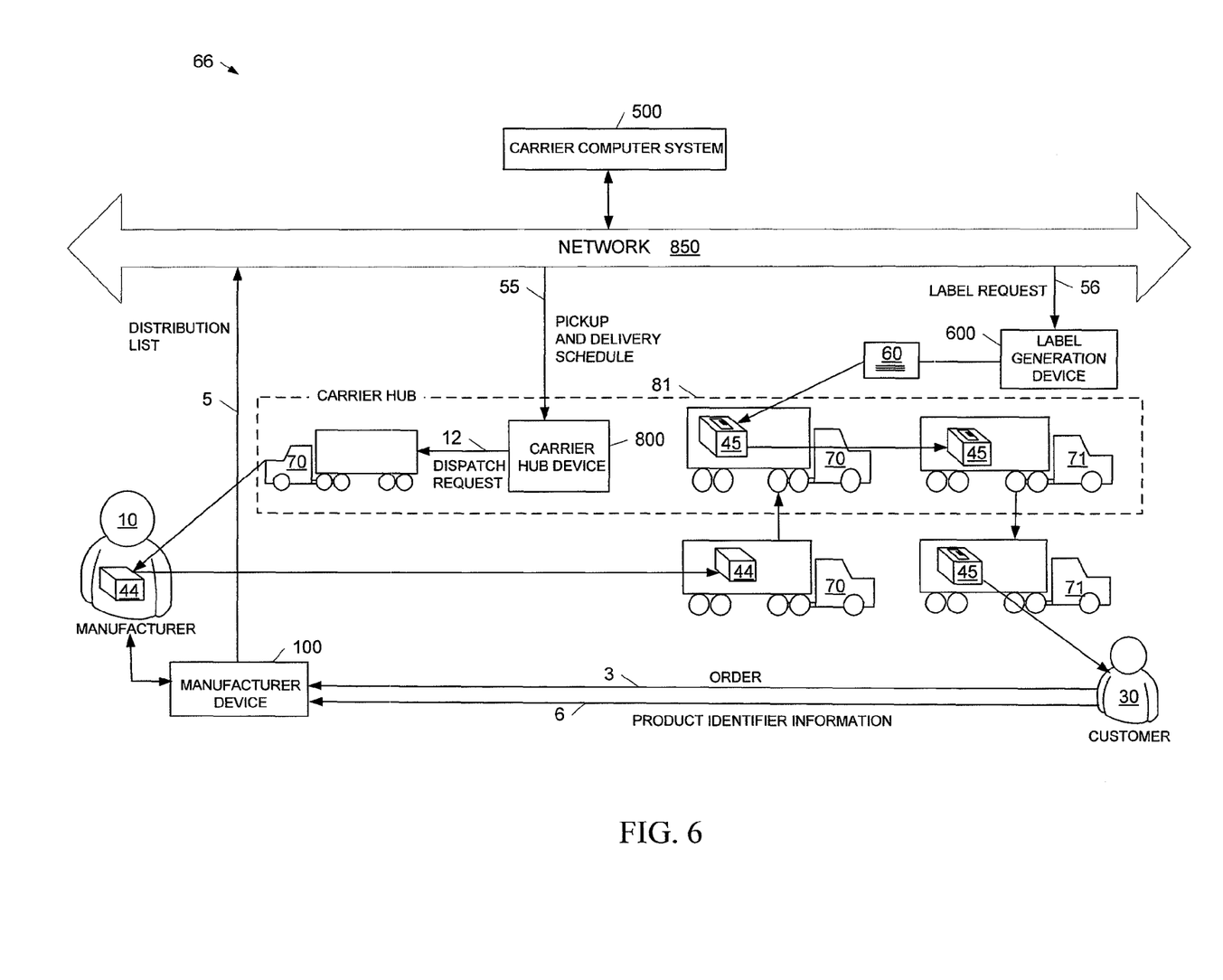
FIG. 6 is a schematic diagram of the data flow between components of the system in accordance with the second embodiment of the present invention.

Referring to FIG. 6, illustrations of a second embodiment of the system and method of the present invention is provided. This embodiment is described in the context of a plurality of customers 30 each placing an order 3 for a product directly with a particular manufacturer 10. The distribution of the product from the manufacturer 10 to the customers 30 is handled by the CCS 500 upon receipt of a distribution list 5 from the manufacturer 10. Since distribution according to various embodiments of the present invention may eliminate the need to apply any labels to the packages at the manufacturing facility before proceeding to the next stage of distribution, fulfillment of the customer's order 3 can be made more quickly.

As in the first embodiment, the manufacturer 10 in the second embodiment may also be a manufacturer that handles the production and packaging of mass quantities of a consumer good. However, in addition, the manufacturer 10 of the second embodiment also manages its own distribution. Therefore, unlike the first embodiment described above, the second embodiment eliminates the need for a separate shipper entity (i.e., the shipper 20 shown in FIG. 2).

Similar to the first embodiment, the customers 30 in the second embodiment may be retail stores. Likewise, in the second embodiment, the carrier is responsible for distributing the unlabeled packages 45 from the manufacturer 10 to the customers 30 in accordance with the distribution list 5. However, in this embodiment, the distribution list 5 may be communicated by the manufacturer device 100, not by the shipper device 200.

FIG. 6 illustrates a second embodiment of the system and the data flow between components of the second embodiment of the present invention. In this system 66, the customers 30 are in communication with the manufacturer 10. The customers 30 may have devices (not shown) capable of communicating with the manufacturer device 100. In one exemplary embodiment, the manufacturer device 100 may be configured to communicate with the CCS 500 via a network 850. In various embodiments, communications from the manufacturer device 100 to the CCS 500 may include a distribution list 5 identifying the customers 30 designated to receive product shipments 45.

In an exemplary embodiment, the CCS 500 is capable of processing the distribution list 5 that is transmitted by manufacturer device 100. This process may be performed using supply/demand module 950, the carrier hub selection module 960, and the pickup and delivery scheduling module 970, as discussed above with respect to the first embodiment.

The carrier hub device 800 may be configured to communicate with the pickup vehicle 70 for purposes of transmitting a dispatch request 12. The dispatch request 12 may include product information and manufacturer location information. In various embodiments, dispatch request may be based at least in part on the pickup and delivery schedule 55. In one embodiment of the present invention, the dispatch request 12 associates vehicle with the manufacturer 10 and includes processing instructions for the unlabeled packages 44. The dispatch request may also include a signifier preventing the CCS 500 or the carrier hub device 800 from scheduling an unloading operation for the pickup vehicle 70. Instead, the unlabeled packages 44 remain in the pickup vehicle 70 until the shipping labels 60 have arrived at the carrier hub 81 and may be affixed to the unlabeled packages 44. Logistics associated with creating and transporting the shipping labels 60 are carried out by the label request module 980, which is discussed above with respect to the first embodiment.

Third Embodiment

Figure 7:
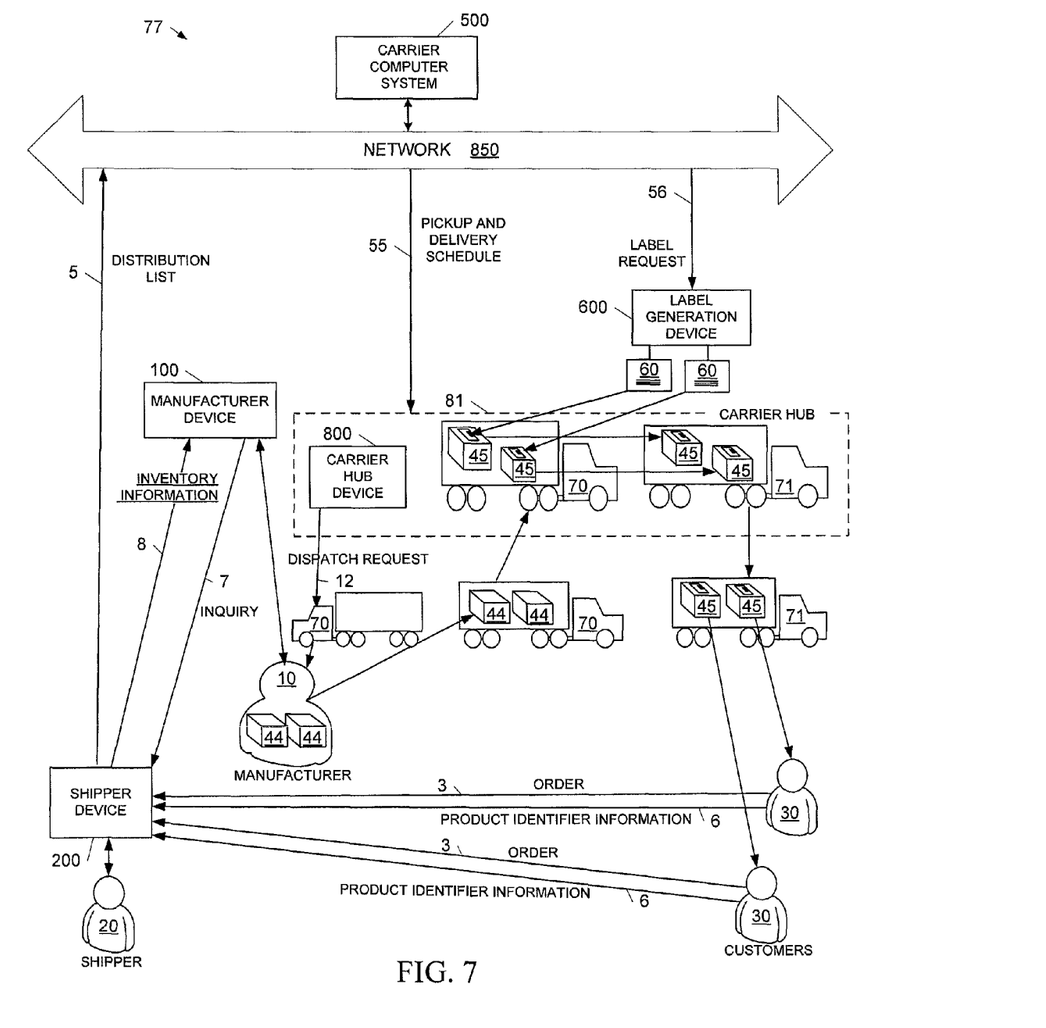
FIG. 7 is a schematic diagram of the data flow between components of the system in accordance with the third embodiment of the present invention.

The system 77 in FIG. 7 depicts the third embodiment of the present invention. In this embodiment, the shipper 20 may be a third party that receives orders 3 for a particular good from the customers 30. In further embodiments, the shipper 20 may be a third party enlisted to facilitate transactions between a manufacturer 10 and the customers 30. For example, the shipper 20 may be enlisted by a chain of retail stores to procure shipments of a certain seasonal good for each of its retail locations. In alternative embodiments, the shipper 20 may be responsible for monitoring and restocking the inventories of a given number of retail stores.

In this embodiment, the customers 30 place their orders 3 for a particular manufactured good with the shipper 20. The orders 3 may specify the quantity of the good desired, a desired date or range of dates for delivery of the good, and a destination address for the delivery. In the present embodiment, the orders 3 are for a one-time shipment 45 of varying quantities of a single type of good. In an alternative embodiment, the single order 3 may request multiple scheduled shipments to the retail store. This alternative embodiment would be most beneficial for a retail store that lacks the capacity to store inventory for extended periods of time or when dealing with goods with short shelf-lives (e.g., goods that are perishable or high in demand).

The shipper device 200 in any of the embodiments described may be capable of transmitting data to and receiving data from the customers 30. The customers 30 may utilize customer devices (not shown) to transmit data to the shipper device 200. In addition to the orders 3, data received from customer 30 may also comprise product identifier information 6. This product identifier information 6 may be processed by the shipper device 200 to determine each customer's shipment requirements.

The shipper device 200 is further capable of transmitting an inquiry 7 to the manufacturer device 100 and receiving inventory information 8 from the manufacturer device 100. Likewise, the manufacturer device 100 is capable of receiving the inquiry 7 from the shipper device 200 and transmitting its inventory information 8 to the shipper device 200.

The shipper 20 receives the customers' orders 3 through a shipper device 200, which is configured to process the orders 3 and produce a distribution list 5. In embodiments of the present invention, the distribution list 5 may include information regarding the manufacturer 10, such as location or stock information. In various embodiments, the shipper device 200 may create the distribution list 5 directly from requests from retail stores (e.g., to replenish stock of a previously ordered good, to stock a newly released good, etc.). In other embodiments, the shipper 20 may exercise greater influence over the contents of the distribution list 5. For instance, the shipper 20 may be responsible for managing the stock of the retail locations and may adjust quantities allocated to individual retail stores. In other alternative embodiments, the shipper 20 may create the distribution list 5 independent of requests from retail stores. For example, a shipper managing a chain of retail stores may want each retail store to receive a single shipment 45 of a new product. In this case, the shipper would create a distribution list directing a single shipment 45 to be sent to each retail store.

In alternative embodiments, the distribution list 5 could be a product of contributions from both the customers 30 and the shipper 20. For example, the shipper 20 could be a movie studio responsible for setting a release date for a movie on digital video disc (DVD), and customers could be retail stores requesting shipments of the DVD. While each retail store can specify a quantity of shipments in its order 3, the movie studio may determine the date of delivery.

In other embodiments, the product identifier information 6 may instead comprise a list of various possible manufacturers. In those embodiments, the CCS 500 may be configured to process the list of manufacturers to determine the manufacturer 10 best suited to supply the product. The CCS 500 may be configured to select the manufacturer 10 using factors such as proximity to the carrier hub 80 or the customer locations, product cost or quality, known manufacturing capacity, or a combination thereof.

In the event that manufacturing capacity is unknown, the CCS 500 can be configured to communicate with the manufacturer device 100 of the selected manufacturer 10 to determine the amount of product the manufacturer 10 can produce. In various embodiments, communication from the CCS 500 may be in the form of an inquiry 7 to the manufacturer 10 regarding current supply or forecasted production. The manufacturer 10 may use its manufacturer device 100 to respond with its inventory information 8. In the present embodiment, the CCS 500 may be capable of processing the inventory information 8 to generate a final order, which it is capable of communicating to the manufacturer device 100. In various embodiments, the final order may comprise product information and total quantities desired.

Components shown in FIG. 7 that remain unaddressed in this section with respect to the third embodiment may operate in the same manner and have the same functionalities as the corresponding components of the first embodiment.

Alternative Embodiments

In various embodiments of the present invention, the manufacturer 10 is a manufacturer of consumer goods. However, in alternative embodiments, it will be appreciated that the manufacturer 10 could also be a non-manufacturing entity such as a distributor, vendor, packager, or assembler of goods, or an inventory storage warehouse.

In various embodiments, the unlabeled packages 44 must be packaged in accordance with guidelines established by the carrier, which are well-known in the art. Exemplary guidelines may be provided by carriers such as the United Parcel Service, Inc. (UPS).

CONCLUDING REMARKS

The present invention delegates tasks that were being handled inefficiently in the prior art (e.g., sorting, labeling, and transporting packages for distribution) to the party most equipped to handle them—the carrier. By entrusting a carrier with full responsibility for a product upon its manufacture, embodiments of the present invention move products to their points of sale using fewer parties and requiring fewer stops than systems and methods in the prior art. Not only do carriers have the resources to handle the distribution efficiently, but they are also able to reduce transportation costs by taking part in the distribution process at the earliest possible stage. By, leveraging optimal equipment utilization, this present invention is able to achieve economies of scale.

As described above and as will be appreciated by one skilled in the art, embodiments of the present invention may be configured as methods or apparatus. Accordingly, embodiments of the present invention may be comprised of various means, including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as a processor, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., a processor) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Moreover, although the foregoing descriptions and the associated drawings describe various embodiments in the context of certain combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Various embodiments of the present invention are directed to a system whereby a carrier dispatches a delivery vehicle to retrieve unlabeled single-type-product packages from a manufacturer, flags the delivery vehicle for special handling upon its return to a carrier location, and arranges for the labeling of the unlabeled packages.

That which is claimed:

1. A computer-implemented method for carrying out the distribution of single-product-type unlabeled packages using a carrier system, the method comprising the steps of:
   (a) receiving a distribution list from a shipper system by a carrier computer system for a plurality of unlabeled packages, wherein:
      (i) each unlabeled package contains no indicia thereon signifying destination information;
      (ii) said distribution list comprises destination information for each unlabeled package; and
      (iii) each unlabeled package contains one or more units of a single type of product;
   (b) generating a pickup and delivery schedule comprising time and destination information associated with the pickup of said plurality of unlabeled packages from a manufacturing facility and the delivery of said unlabeled packages to a plurality of respective destinations, wherein said pickup and delivery schedule is based at least in part on said distribution list;
   (c) dispatching a pickup vehicle to said manufacturing facility to retrieve said unlabeled packages based at least in part on said pickup and delivery schedule;
   (d) delivering the plurality of unlabeled packages from said manufacturing facility via the pickup vehicle to a distribution point in accordance with said pickup and delivery schedule;
   (e) generating a plurality of shipping labels, wherein said shipping labels comprise destination information based at least in part on said pickup and delivery schedule;
   (f) affixing said plurality of shipping labels to said plurality of unlabeled packages at said distribution point, wherein application of any one of said plurality of shipping labels to any one of said unlabeled packages will thereby yield one or more shipments, and wherein any one of said plurality of shipping labels may be applied to any one of said plurality of unlabeled packages; and
   (g) transporting said shipments from said distribution point to said respective destinations in accordance with said pickup and delivery schedule.

2. The method of claim 1, wherein the generating of a plurality of shipping labels comprises the steps of:
   transmitting a label request to a label printing device, wherein said label request is based at least in part on said pickup and delivery schedule, and
   printing said shipping labels using said label printing device in accordance with said label request.

3. The method of claim 2, further comprising the step of:
   in response to generating a plurality of shipping labels, delivering said shipping labels from said label printing device to said distribution point, wherein said label printing device is located at a site remote from said distribution point.

4. The method of claim 2, wherein a sequence in which said shipping labels are printed is pre-determined.

5. The method of claim 1, wherein said distribution information comprises a list of destination addresses and a quantity of packages corresponding to each of said destination addresses.

6. The method of claim 1, further comprising the step of:
prior to generating said pickup and delivery schedule, receiving one or more specified delivery dates corresponding to one or more destinations for said shipments, and wherein said pickup and delivery schedule is based at least in part on said specified delivery dates.

7. The method of claim 6, wherein the generating of said pickup and delivery schedule comprises the steps of:
submitting a request for a specified quantity of a single type of product to said manufacturing facility;
receiving a response to said request from said manufacturing facility indicating a first possible date for pickup;
querying a carrier time-in-transit database to determine a last possible date for pickup that would permit delivery of said shipments by said specified delivery dates, wherein said carrier time-in-transit database specifies the number of days said carrier requires to deliver a shipment from said distribution point to said destination; and
determining a permissible range of pickup dates for the dispatching of said pickup vehicle to said manufacturing facility, wherein said permissible range of pickup dates is based at least in part on said first possible date for pickup and said last possible date for pickup, and the dispatching of said pickup vehicle is performed between said permissible ranges of pickup dates.

8. The method of claim 7, wherein said request includes a need-by date and said need-by date is based at least in part on said specified delivery dates.

9. The method of claim 1, further comprising the step of storing said unlabeled packages in said delivery vehicle at said distribution point until completion of said step of affixing of said shipping labels.

10. The method of claim 1, wherein Steps (f) and (g) are performed by said carrier system.

11. A carrier system for carrying out the distribution of single-product-type unlabeled packages to a plurality of respective destinations, said system comprising:
(a) an order-processing computer comprising one or more processors and one or more memory storage areas, said one or more processors configured to:
receive an order from a shipper device, wherein said order comprises:
a product identifier associated with a type of product, wherein at least one unit of said type of product is contained in each of a plurality of unlabeled packages, each of said plurality of unlabeled packages containing no indicia thereon signifying destination information; and
a distribution list comprising destination information corresponding to said unlabeled packages;
generate a label request for the creation of a plurality of shipping labels based at least in part on said order; and
generate a pickup and delivery schedule comprising time and location data associated with the pickup of said unlabeled packages from a manufacturing facility and the delivery of said unlabeled packages to a plurality of respective destinations;

(b) a carrier hub computer in communication with the order-processing computer comprising one or more processors and one or more memory storage areas, said one or more processors configured to dispatch a pickup vehicle based at least in part on said pickup and delivery schedule to pick up and deliver said unlabeled packages to a distribution point;

(c) a labeling device configured to print said plurality of shipping labels based at least in part on said label request for application to the unlabeled packages at said distribution point, wherein application of any one of said plurality of shipping labels to any one of said unlabeled packages will thereby yield a shipment.

12. The carrier system of claim 11, wherein said label request specifies a sequence for printing said shipping labels.

13. The carrier system of claim 11, wherein said destination information comprises a list of destination addresses and a quantity value corresponding to each of said destination addresses.

14. The carrier system of claim 13, wherein said destination information further comprises one or more specified delivery dates corresponding to one or more destinations for said shipments, wherein said pickup and delivery schedule is based at least in part on said specified delivery dates.

15. The carrier system of claim 11, wherein said order-processing computer is further configured to:
receive information regarding production schedule at said manufacturing facility;
process said information regarding production schedule at said manufacturing facility to determine availability of unlabeled packages for pickup;
query a carrier time-in-transit database to determine time-in-transit information for each of said plurality of shipments, wherein said time-in-transit information comprises the number of days required by said carrier to deliver said shipment from said distribution point to said respective destination for each of one or more carrier service levels;
process said availability of unlabeled packages for pickup, said time-in-transit information, and said specified delivery dates to determine a permissible range of pickup dates for picking up unlabeled packages at said manufacturing facility; and
select pickup date of pickup and delivery schedule from said permissible ranges of pickup dates.

16. The carrier system of claim 11, wherein said distribution point is a carrier hub facility.

17. The carrier system of claim 11, wherein said pickup vehicle is further capable of storing said unlabeled packages at said distribution point until each of said plurality of unlabeled packages is affixed with a shipping label.

18. The carrier system of claim 11, wherein said labeling component is configured for a labeling machine to apply said shipping labels to said unlabeled packages.

19. The carrier system of claim 11, wherein said labeling component is configured for human handlers to apply said shipping labels to said unlabeled packages.

20. The carrier system of claim 11, wherein said labeling component is configured to print said plurality of shipping labels at a site remote from said distribution point and is further configured to deliver said shipping destination labels from said site to said distribution point.

* * * * *